United States Patent [19]

Bell

[11] Patent Number: 5,271,980
[45] Date of Patent: Dec. 21, 1993

[54] FLEXIBLE EVACUATED INSULATING PANEL

[76] Inventor: Dennis J. Bell, 885 Berry Ave., Los Altos, Calif. 94022

[21] Appl. No.: 734,307

[22] Filed: Jul. 19, 1991

[51] Int. Cl.⁵ .............................................. E04C 2/34
[52] U.S. Cl. ...................................... 428/68; 428/69; 428/72; 428/75; 428/76; 428/178; 428/182; 428/184; 52/309.9; 52/309.11; 52/612; 52/791; 52/796
[58] Field of Search ............... 428/68, 69, 76, 72, 428/75, 182, 184, 178; 52/791, 796, 612, 309.9, 309.11

[56] References Cited

U.S. PATENT DOCUMENTS

| | | | |
|---|---|---|---|
| 1,984,007 | 12/1934 | Babbitt | 189/34 |
| 2,233,190 | 2/1941 | Amorosi | 52/791 |
| 2,809,908 | 10/1957 | French | 428/76 |
| 3,264,165 | 8/1966 | Stickel | 52/791 |
| 3,388,509 | 6/1968 | Mora | 52/309.11 |
| 3,769,770 | 11/1973 | Deschamps et al. | 52/404 |
| 3,936,553 | 2/1976 | Rowe | 428/81 |
| 4,304,824 | 12/1981 | Karpinski | 428/69 |
| 4,317,854 | 3/1982 | Rathmell | 428/182 |
| 4,399,175 | 8/1983 | Kummermehr | 428/76 |
| 4,420,922 | 12/1983 | Wilson | 52/791 |
| 4,468,423 | 8/1984 | Hall | 428/72 |
| 4,681,788 | 7/1987 | Barito | 428/69 |
| 4,791,773 | 12/1988 | Taylor | 52/790 |
| 5,027,574 | 7/1991 | Phillip | 52/791 |
| 5,107,649 | 4/1992 | Benson | 428/69 |

FOREIGN PATENT DOCUMENTS 727775  4/1980  U.S.S.R.

*Primary Examiner*—Ellis P. Robinson
*Assistant Examiner*—Nasser Ahmad

[57] ABSTRACT

A flexible evacuated insulating panel comprises a first flexible external sheet (10) opposing a second flexible external sheet (20), each sheet comprises a plurality of corrugated gas impermeable layers (11) and (21) joined with a gas tight seal (18) to form an internal space that is evacuated of air (19). Spacers (12 and 22) press against a membrane (28) to resist the facewise compressive forces. The evacuated insulating panel is flexible, both in use and in application. As such, the panel may be manually applied to curved surfaces for any high-performance insulator application. The flexible evacuated insulating panel is mass-producible and useful in many different applications without custom design or manufacturing.

33 Claims, 9 Drawing Sheets

STRESS-STRAIN RELATIONSHIP FOR RESILIENT MATERIAL

FLEXIBLE EVACUATED INSULATING PANEL

BACKGROUND

1. Field of Invention

This invention relates to flexible panels or sheet structures having internal evacuated cavities, specifically to panels of this type which are used to provide vacuum thermal insulation.

2. Description of Prior Art

The thermal insulating effects of a vacuum are well known. When the pressure of a gas is reduced to a high vacuum its ability to transmit heat by conduction or convection becomes substantially zero. Here a high vacuum is defined as one having a pressure less than 0.1 Newton per square meter (approximately one millionth of normal atmospheric pressure). Unlike conventional, gas-filled, thermal insulating layers, the insulating effectiveness of a vacuum is not a function of the thickness of the evacuated cavity. That is, the evacuated cavity may be very thin while still providing highly effective thermal insulation. Evacuated cavities are also useful in insulating high electric voltages. Another use for evacuated cavities is as acoustic insulators.

Many structures have been disclosed that use the insulating effect of a vacuum. Evacuated insulation requires a sealed, double-walled container defining an internal cavity held at a high vacuum. The structure must be resistant to the surrounding, ambient, pressure. That ambient pressure averages 101,320 Newtons per square meter (14.7 pounds per square inch) in air at sea level.

There are many applications for an insulating structure that is thin in comparison to its width and length, i.e. a panel or sheet-like structure. All prior-art evacuated panel structures have two external sheets, joined at their edges to form an internal space, with internal members that act as spacers between the external sheets. Such evacuated insulating panels must satisfy three principal requirements: resistance to collapse, low-conductivity internal spacers, and impermeability to external gas flow into the interior evacuated space.

The forces acting to collapse the evacuated panel act in two ways. The ambient pressure first acts directly against the large area of the external sheets to force them together. Here that is called a facewise force. A second collapsing action is due to that portion of the ambient pressure that acts on the edges of the evacuated panel, causing them to be forced toward the middle of the panel. Here that is called an edgewise force.

The internal spacers resist the compressive stresses produced by the facewise force. Nearly all heat conduction through the middle of evacuated panels is through the internal spacers. To limit that thermal conduction the internal spacers are usually made of materials having low thermal conductivity. An alternative method to limit thermal conduction uses spacers designed with at least one portion having a limited cross-sectional area or increased length.

The external sheets of evacuated panels must have at least one impermeable layer. Without an impermeable layer, passage of gases from the exterior would eliminate the internal high vacuum and cause the insulation to become ineffective. According to "Ultrahigh Vacuum Practice" by George Frederick Weston, Butterworth & Co. Ltd. 1985 (ISBN 0-408-01485-7), the quantity of gas passing through a solid wall is proportional to a "permeation constant" and inversely proportional to the thickness of the wall. The permeation constant varies with temperature, the particular gas, and the material of the wall. Glasses and ceramics are generally impermeable, but are also rigid and brittle. Polymers (plastics) and rubbers are flexible, but are generally orders of magnitude more permeable to gases than glasses and ceramics. Only metals combine good impermeability with an ability to flex in use to a useful degree.

All prior evacuated insulating panels have been rigid, or only semi-flexible. This is the result of attempts by prior designers to satisfy the three principal requirements: resistance to collapse, low-conductivity internal spacers, and impermeability. In U.S. Pat. No. 4,468,423 (1984) Hall discloses rigid parallel external sheets for the panel walls, to resist collapsing forces. In U.S. Pat. No. 4,420,922 (1983) Wilson discloses internal ribs as spacers, allowing thinner material to be used in the external sheets, but the spacer ribs act to stiffen the walls. Prior evacuated insulating panels have generally used a single layer of material in the external sheet to provide both resistance to collapse and impermeability. In U.S. Pat. No. 3,936,553 (1976) Rowe discloses impervious surface sheets of generally rigid materials. Rowe's use of sheets made of highly-impermeable aluminum would allow the external sheets to be relatively thin, but these sheets would be subject to cracking and failure if flexed in use. Both Rowe and Wilson show pre-shaped external sheets to provide even more rigidity than provided by a simple flat sheet design.

Taylor, in U.S. Pat. No. 4,791,773 (1988), discloses thin walls with a separate plastic sheet to act as an impermeable layer. Plastic in thin layers is flexible, but as noted earlier, is highly permeable to gases, especially in thin layers. Taylor also uses undulated spacers that act to stiffen the entire panel into rigidity.

Karpinski, in U.S. Pat. No. 4,304,824 (1981), describes a modular insulation quilt having flexible outer layers, with fused edges, surrounding a plurality of shaped foamed material in vacuum. The foamed material is formed into expanded pellets that act as spacers filling most of the interior. The expanded pellets, while of low conductivity, still provide heat paths through the middle of the panel and must have a substantial thickness to limit heat losses.

Karpinski's panel is not flexible. The pellet spacers are forced together strongly by atmospheric pressure forming a semirigid solid that would be difficult to bend by itself. The pellets are covered by an outer layer of hard nylon polyester or aluminum foil, which materials cannot stretch to any large degree before failure. The resulting panel is strongly constrained against flexure because the pellets on the concave side of a bend must be compressed further. Further, Karpinski's panel can conform to such a bend only with attendant buckling in the outer layer on the concave side of the bend. Repeated bending of Karpinski's panel would crack the outer layer at the buckling point and cause failure from loss of the vacuum.

Rathmell, in U.S. Pat. No. 4,317,854 (1982), describes a panel structure having two metal sides with corrugations three inches (80 mm) apart and 1⅛ (26 mm) inches deep. He states that the corrugations can resist pressure up to 14.7 psi (10 Newtons per square centimeter) without bending. Adjacent corrugations from respectively opposite metal sides are joined in the interior by a web of glass fibers which are stressed in tension and are generally parallel to the panel. Rathmell states that such a panel may be curved to provide a cylindrical tank, implying a capability of limited flexure about an axis that is parallel to the corrugations.

Rathmell's panel is not flexible. This is indicated by his statement that such a panel would need to be specially "constructed to maintain an evacuated space around a 90° corner," illustrating a limitation in the panel's inherent ability to flex. When bent, one corrugated sheet takes on an overall convex shape when seen from the outside, requiring the corrugation depth to decrease. The opposite sheet takes on an overall concave shape when seen from the inside, requiring its corrugation depth to increase. The sharpness of the bend is limited by the geometric limitation in the changes in corrugation depth before the two sheets touch, reducing the adaptability of Rathmell's panel. Second, his panel can only flex in one axis, parallel to the corrugations, and therefore could not be shaped to follow compound curves. The corrugations described by Rathmell would stiffen such a panel against bending on an axis orthogonal to those corrugations. Third, the edge seals shown by Rathmell show no special ability to lengthen or compress in such a way as to allow any substantial bending in the panel without failure. Fourth, his panel uses a monolithic wall structure of metal that supports collapsing forces and also forms the impermeable layer. To support the collapsing forces, the walls described by Rathmell must be thick, perhaps 1/16 to ⅛ inch (1.5 to 3 mm). With such thick walls, bending the sheet sets up forces in each sheet where one side is in tension and the other in compression. These differential forces in the sheet tend to crack the wall, making it quite vulnerable to cracks through fatigue failure. Upon cracking, the evacuated space would soon fill with gas from the exterior.

There is a particular limitation to rigid, or semi-flexible, evacuated insulating panels compared to rigid air-filled insulation. This is because it is not possible to cut or shape evacuated insulators to size without violating the integrity of the vacuum space. Therefore, rigid or semi-flexible evacuated insulating panels require that each panel be customized to fit each application, since the panels have only limited ability to change shape after fabrication. Therefore, mass production techniques cannot be applied to reduce the cost of making and applying rigid evacuated insulating panels.

In summary, prior evacuated panels or sheet insulators have the following disadvantages:
(a) Evacuated panels have been rigid, or only semi-flexible. They have no, or only a limited, ability to be sharply bent after fabrication without failure of the vacuum insulation.
(b) Previous semi-flexible evacuated panels have only been bendable in one axis, and therefore could not be bent to follow a compound curve.
(c) Previous semi-flexible evacuated panels have combined the structural elements necessary to resist collapsing forces and provide impermeability into a single monolithic material. Such a combination requires a thick layer of material, limiting the number of flexure cycles in such panels before fatigue failure causes cracks in the impermeable layer.
(d) Previous rigid and semi-flexible evacuated panels require custom design and manufacture for most applications, precluding the benefits of mass production.

OBJECTS AND ADVANTAGES

Accordingly, several objects and advantages of the present invention are:
(a) To provide an improved evacuated insulating panel that is highly flexible and can be bent into sharp curves after fabrication without failure.
(b) To provide an improved evacuated insulating panel that can be bent in both planar axes, and therefore can be bent to follow a compound curve.
(c) To provide an improved evacuated insulating panel that separates the structural elements, thereby providing resistance to collapse of the structural elements which provide impermeability. With such a separation, the panel's ability to withstand multiple cycles of bending without fatigue failure of the impermeable layer is greatly increased.
(d) To provide an improved evacuated insulating panel that is useful in many end applications without the need for custom design and fabrication, due to its ability to be bent into a complex shape. This allows economies in its manufacture by mass production techniques.

A further object is to provide a panel with very low thermal and electrical conductivity, reduced thickness, and low weight compared to any prior non-evacuated flexible insulation. This extends the benefits of high performance evacuated insulation to applications now limited to gas-filled insulators. These applications include those requiring very high thermal insulation properties, reduced volume, low weight, and the ability to conform to curved surfaces.

A yet further object is to provide evacuated panel or sheet insulators for applications requiring flexure in use. These include insulated garments, underwater suits, and space suits or any use requiring that the insulation conform to a varying shape in operation. These applications also include insulating vessels, pipelines and the like where variability of the internal or external temperatures causes varying thermal expansion, which could cause fatigue failure in a rigid evacuated panel. In those applications of variable strain, my flexible evacuated insulating panel or sheet will withstand greater strain changes, and more cycles of strain, without failure of the gas impermeable layer.

The above and still further objects and advantages will become apparent from a consideration of the ensuing description and drawings.

DRAWING FIGURES

Figure 1:
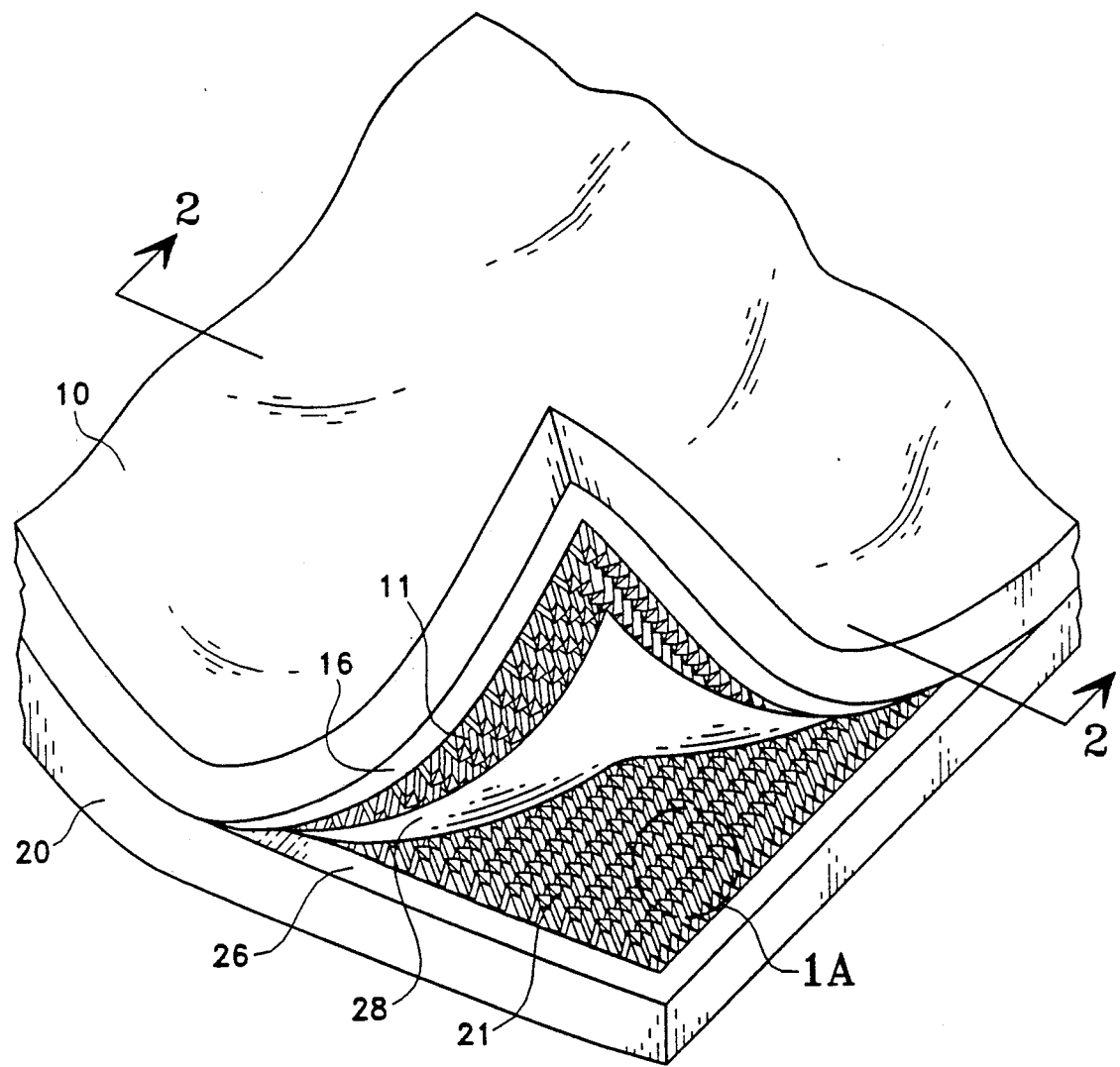
FIG. 1 shows a perspective view of a flexible evacuated insulating panel in accordance with my invention using resilient external walls with a tension membrane internal spacer, with the forward corner delaminated to show the internal structure.

REFERENCE NUMERALS IN DRAWINGS 10 first resilient sheet
11 first flexible impermeable layer
12 projecting compression supports of first sheet
13 end of a projecting compression support of first sheet
14 radius of bend
15 panel thickness
16 edge of first resilient sheet
17 edge of first flexible impermeable layer
18 sealing material
19 evacuated space
20 second resilient sheet
21 second flexible impermeable layer
22 projecting compression supports of second sheet
23 end of a projecting compression support of second sheet
24 upward fold line in impermeable sheet
25 downward fold line in impermeable sheet
26 edge of second sheet
27 edge of second flexible impermeable layer
28 tension membrane
29 tension membrane termination
30 first resilient sheet
31 first flexible impermeable layer
32 rigid compression supports of first sheet
33 end of a compression support of first sheet
34 lateral compression stiffeners on membrane
36 edge of first resilient sheet
38 sealing material
39 evacuated space
40 second resilient sheet
41 second flexible impermeable layer
42 rigid compression supports of second sheet
43 end of a compression support of second sheet
44 cross-lateral compression stiffeners on membrane
45 impermeable layer sheets
46 edge of second resilient sheet
48 tension membrane
49 tension membrane termination
50 first resilient sheet
52 first flexible impermeable layer
53 first impermeable sublayer
54 resilient sublayer
55 second impermeable sublayer
56 edge of first impermeable sheet
58 sealing material
59 evacuated high-porosity layer
60 second resilient sheet
62 second flexible impermeable layer
66 edge surface of second impermeable sheet
69 particulates
70 first inflated impermeable cellular sheet
72 projecting compression supports of first sheet
74 end of a projecting compression support of first sheet
76 inflated cell in first cellular sheet
79 evacuated space
80 second inflated impermeable cellular sheet
82 projecting compression supports of second sheet
84 end of a projecting compression support of second sheet
86 inflated cell in second cellular sheet
88 tension membrane
89 tension membrane termination
90 pipe

DEFINITIONS

The following are definitions of terms used in the specifications and claims. "Resilient" means a material that will deform elastically upon an applied compressive or tensile force, returning to its original shape upon removal of the applied force. "Flexible" means a material or structure that will easily bend upon application of an applied force, and that can easily return to its original shape without any damage to the material or structure. A flexible panel or sheet is easily bendable in either planar direction. "Impermeable" means any material or structure that does not allow the passage of gases, or only allows passage of gases at a very slow rate compared to the useful life of the structure. "Membrane" means any sheetlike element that is thin and flexible, and able to support tensile loads. As such, a membrane may be formed from a continuous sheet, a sheet with openings, or a "web" (as defined by Rathmell) of multiple filaments.

Description—FIGS. 1, IA, IB, 2, and 2A—Resilient Walls With Tension Membrane

A typical embodiment of a flexible evacuated insulating panel using resilient walls with a tension membrane is illustrated in FIG. 1—a perspective view. The panel comprises a first resilient sheet 10 to which is laminated a first flexible impermeable layer 11. Below layer 11 is a tension membrane 25. Below membrane 25 is a second resilient impermeable layer 21 which is laminated to a second resilient sheet 20.

Figure 2:
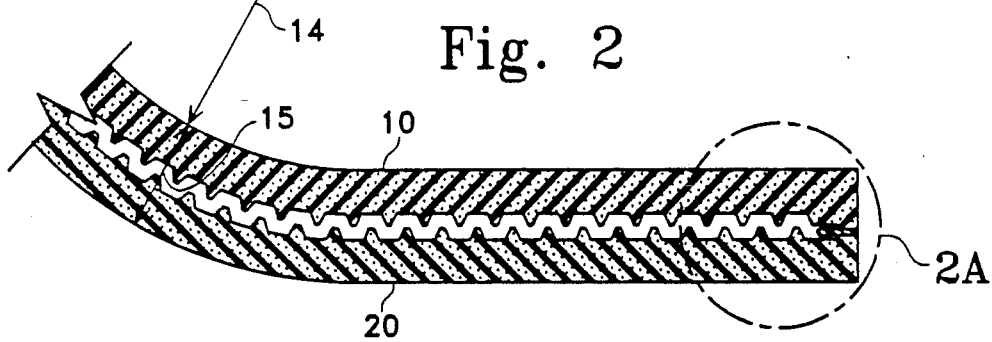
FIG. 2 shows a cross-sectional view of the flexible evacuated insulating panel of FIG. 1 as seen in the direction indicated by line 2—2.
Figure 2A:
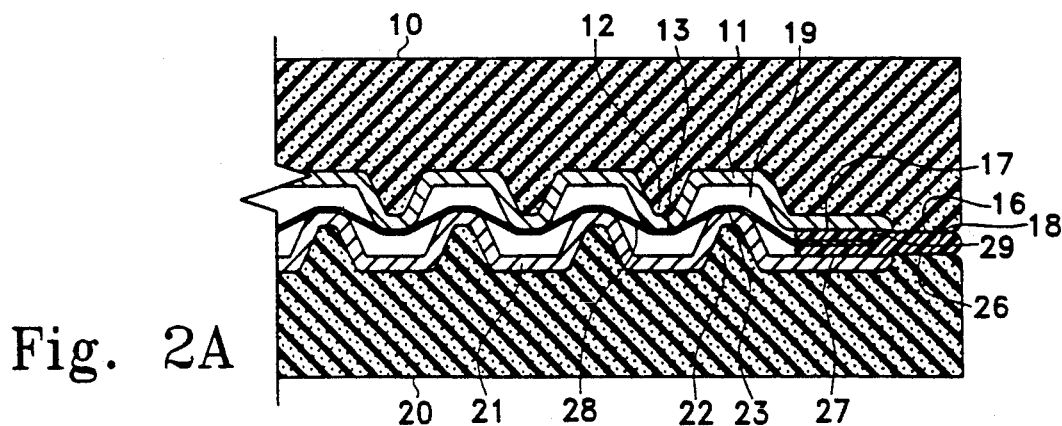
FIG. 2A shows an enlargement of the cross-section of FIG. 2, with details of the interior structure and end seal.

FIG. 2 is a cross-sectional view of the flexible insulating panel of FIG. 1 as seen in the direction indicated by line 2—2 and FIG. 2A is an enlarged view of FIG. 2 showing the interior and end seal. These figures further illustrate the internal structure of this embodiment. Layers 11 and 21 have interengaging, but non-contacting, projecting compression supports 12 and 22 respectively, which act as spacers. Supports 12 and 22 have ends 13 and 23, respectively. These are the only portions of the impermeable layers that touch membrane 28.

Figure 1B:
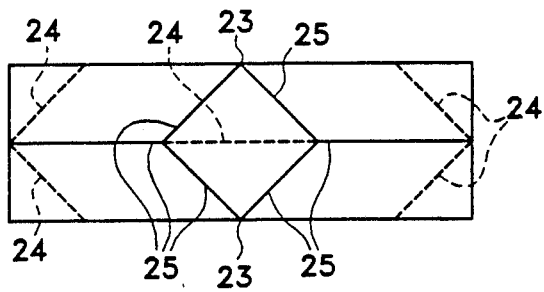
FIG. 1B shows one pattern of a folding diagram of the impermeable sheet of FIG. 1A that forms one projecting compression support.
Figure 1A:
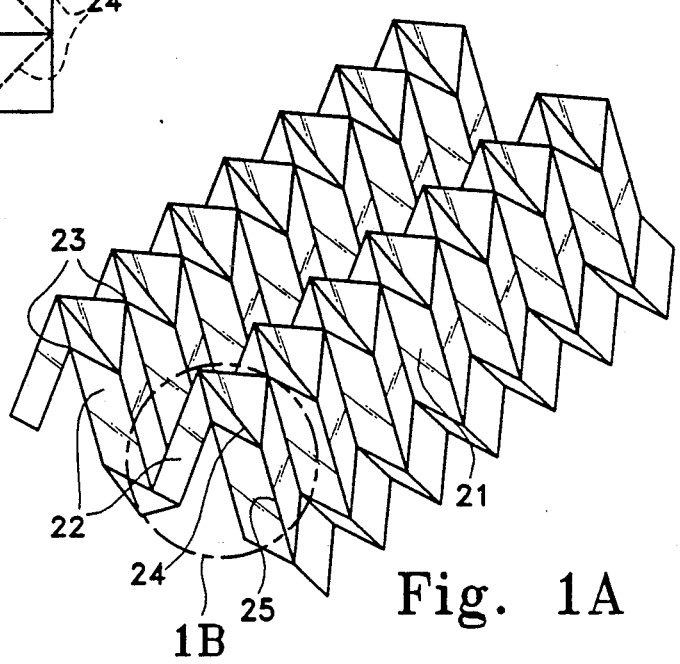
FIG. 1A shows an enlargement of the corrugations in the flexible, impermeable layer of FIG. 1.

FIG. 1A is an enlargement of the impermeable layer of FIG. 1 and FIG. 1B is one pattern of a folding diagram of one compression support of FIG. 1A. These figures further illustrate the construction of layer 21. Layer 21 is comprised of a thin sheet of impermeable material that is folded as shown to form a layer that is corrugated in both orthogonal directions. Each projecting support 25, is formed by folding in the pattern shown, upward along dashed lines 24 and downward along solid lines 25. In each pattern, there are two upper isosceles triangles having two 45 degree angles. Each end 23 is formed at the vertex of the two shorter sides of an upper isosceles triangle. Each of the shorter sides of each of these upper isosceles triangles joins by a downward fold to a parallelogram. The sides of each parallelogram opposite the upper isosceles triangles join to lower isosceles triangles at a 45 degree angle. The longer sides of the two upper isosceles triangles join in a upward fold, and the sides of adjacent parallelograms join in a downward fold. Upon making these folds multiple times in adjacent and connecting areas in the sheet of impermeable material, it forms impermeable layer 21 with projecting supports 22 and ends 23.

As shown in FIGS. 1, 2, and 2A, sheets 1o and 20 have edges 16 and 26 at their perimeters. Layers 11 and 21 also have edges 17 and 27 at their perimeters. Edges 16, 17, 26, and 27 are joined with a sealing material 18 to form a gas-tight bond that also forms a tension membrane termination 29. That construction defines an interior space 19 that is evacuated of air.

The panel can have any suitable dimensions. In this embodiment the gap between layers 11 and 21 defining space 19 may be very small. This is because, as stated previously, the insulating value of a vacuum does not depend on its thickness. The principal thermal conductivity loss is through membrane 28. For a given ambient pressure, the thickness of membrane 25 is determined by the geometry of the design and the strength of the membrane material. A typical thickness of membrane 28 is 0.01 to 0.1 mm. It is advantageous to arrange many smaller supports 12 and 22, so that the force of the ambient pressure is spread over many supports, and membrane 25 can then be thin. Typical heights for supports 12 and 22 are 1 mm to 5 mm. The thickness of the sheets forming layers 11 and 21 are minimized, consistent with long-term maintenance of the vacuum, with typical thicknesses of 0.05 to 0.2 mm. Generally, the thicknesses of sheets 10 and 20 are minimized, consistent with resisting the edge compression forces, with a typical thickness of 5 to 10 mm. The typical overall thickness 15 of the insulating panel is 10 to 25 mm.

Many materials are suitable for sheets 10 and 20. Such a material may preferably take the form of a closed-cell or open-celled foamed elastomer, such as foamed polyvinyl chloride or foamed polyurethane. One advantage of foamed materials is that they may be formed over the corrugations of layers 11 and 21 to make the outside of the panel flat.

Typically, impermeable layers 11 and 21 will be metal sheets. Plastics are permeable to some extent to all gases via diffusion through pores in their structure, according to Weston. The few plastic materials that have been found suitable for high vacuum applications, including PTFE (polytetrafluorethylene) and polyester, still have permeabilities orders of magnitude greater than glasses or metals. Glasses and ceramics are generally impervious (permeation being through microstructure pores), but they are also generally inflexible, and are not suitable for use in layers 11 and 21. Only metals combine low permeability with flexibility. Generally only gases that are soluble in the metal will permeate through it. These gases are hydrogen and oxygen in most metals, and water vapor in mild steel. Therefore, typical materials for layers 11 and 21 are aluminum, copper, or stainless steel, or their alloys with other metals.

Standard polymer bonding materials, including epoxies and silicones, are suitable for sealing material 18, since only a small area is presented to the evacuated interior and the path for gas flow is long. Membrane 25 may preferably be made of a high strength, low stretch, polymer sheet such as a polyester. Polyester has the advantage of having low thermal conductivity.

Other suitable membrane materials are metals, glass filaments, and polymers having high tensile strength and resistance to stretching. The tension membrane may also include one or more low-emissivity surfaces to reduce the transmission of radiated heat. All materials should be selected to maintain their properties of strength and gas impermeability for the desired temperature range of operation.

It may be appreciated that many different shapes, sizes and placements of sheets 10 and 20, compression supports 12 and 22, and membrane 28 are possible that are consistent with the claimed flexible evacuated insulating panel. Standard engineering practices of material selection and mechanical design may be used to calculate the suitability of different designs, considering the loads that will placed on the panel.

Operation—FIGS. 1, 1A, 1B, 2, 2A, and 2B

The flexible evacuated insulating panel described in FIGS. 1, 1A, 1B, 2, and 2A becomes a thermal insulator as the air is evacuated from internal space 19 to a high vacuum. One simple way to evacuate the air is to assemble and seal the panel in an evacuated chamber. The continued insulating performance depends on the maintenance of the vacuum over time. "Getter" materials, such as carbon, calcium chloride, aluminum, and barium metal may be placed in the interior to absorb any gases that leak inside. However, it may still be necessary to restore the vacuum to a sufficient degree if gas leakage does occur. Leakage gases may be removed with a pump. Such a vacuum pump can be permanently connected to space 19 and can be energized periodically upon control of a timer or in response to detection of a leak by a sensor. Alternatively, a valve may be attached to sheets 10 or 20, with a valved passage to space 19, for occasional attachment of a vacuum pump to restore the high vacuum.

Upon exposure to ambient pressure, sheets 10 and 20 are pressed toward each other by a facewise force. In this typical embodiment, this compression is resisted by arrayed compression supports 12 and 22 pressing against membrane 28. With this construction, compressive forces in supports 12 and 22 are converted into tensile forces in membrane 19. Since a membrane can be made very thin in relation to the forces on it, the cross-section area of the thermal conductivity path can be made very small. Such a small area reduces to a minimum the thermal loss through the middle of the panel.

The insulating panel must support the facewise and edgewise compressive forces of the ambient pressure against the evacuated space. The coupling of the facewise forces to membrane 28 requires supports 12 and 22 to resist collapsing forces in the plane of the panel. Also, membrane termination 29 angle determines a force pulling on support ends 13 and 23. Further, the edgewise forces from the ambient pressure force the edges of the evacuated panel toward the middle. These collapsing forces in the plane of sheets 10 and 20 are resisted by compression in the material comprising these sheets.

The material chosen for sheets 10 and 20 must be controllably resilient, so that the sheets do not deform more than a certain percentage of their unstrained dimension under loads of the order of the ambient pressure. Upon evacuation, the collapsing forces in the panel plane will compress the resilient sheets. Typically, such deformation will be under 25% to maintain space 19. Further, to maintain flexibility for the entire panel, the materials must be selected so that further distortion is possible.

FIG. 2—a cross-sectional view as seen in the direction indicated by line 2—2 shows the insulating panel in bending operation. The entire evacuated insulating panel is flexible, having the ability to bend under applied manual forces while maintaining the insulating properties of the evacuated interior. As the panel is bent, it forms a radius of bend 14 as taken along the curve of the panel surface on the inside of the bend. A dimensionless ratio of radius 14 to panel thickness 15 characterizes the sharpness of the bend. In bending operation resilient sheets 10 and 20 are able to compress and expand to a degree. Layers 11 and 21 are able to compress and expand, though made of metallic sheets with little ability to stretch, because of their corrugated folding. Membrane 28 bends only, being made of a material that resists stretching.

Figure 2B:
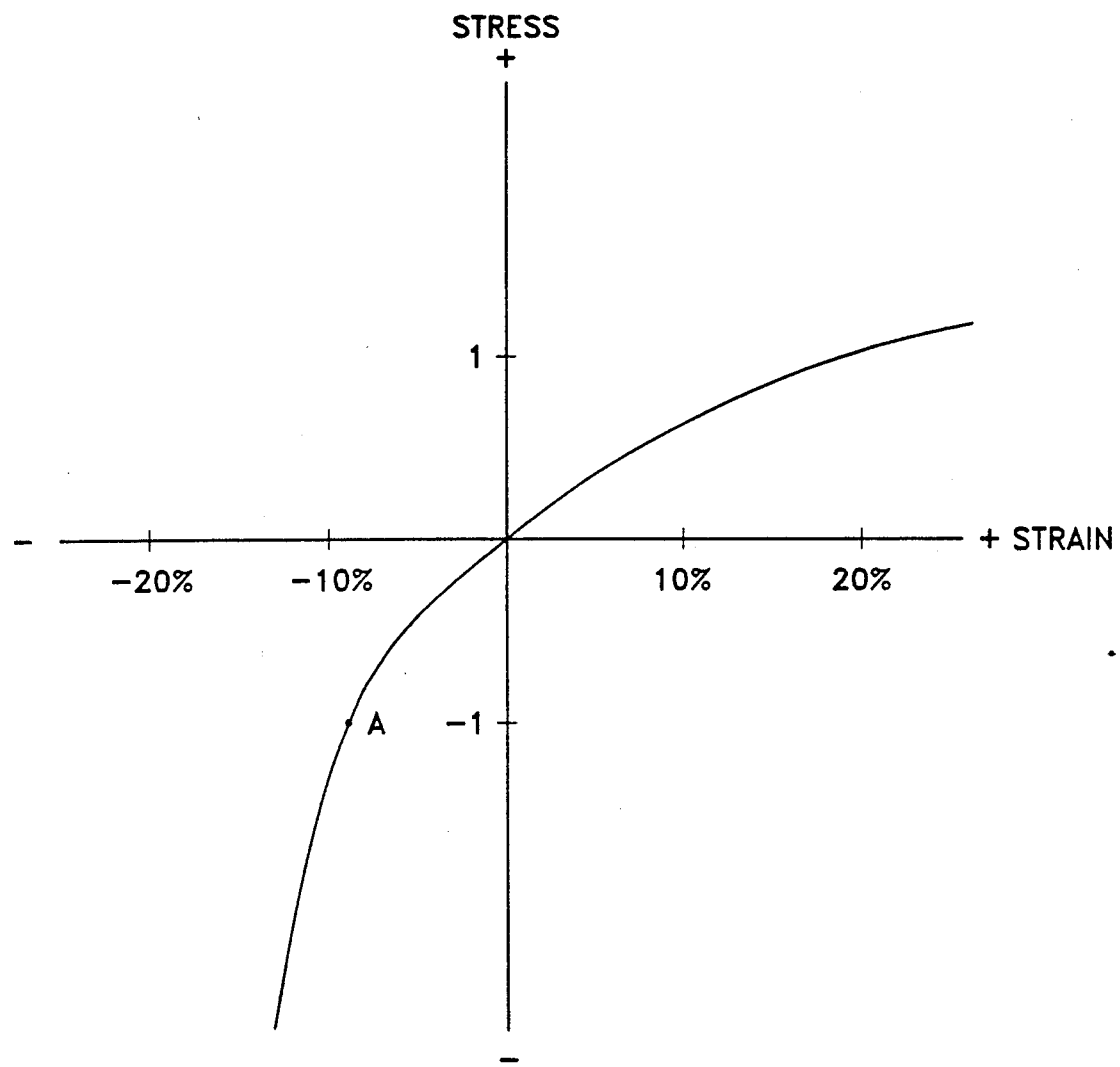
FIG. 2B shows a graph of the stress-strain relationship for the resilient material of FIGS. 1, 2, and 2A.

FIG. 2B is a graph of the stress-strain relationship for resilient material; it shows how material selection for sheets 10 and 20 can optimize bending operation. Preferably, the sheet material is selected with a non-linear stress-strain relationship, resisting a compressive load, i.e., negative stress, more stiffly than it will a tensile load, i.e., positive stress. Initially, the resilient material is compressively loaded at point A by the collapsing forces. When bent, an additional compressive stress applies to the sheet on the inside of the bend and an equal tensile stress applies to the sheet on the outside of the bend. Yet, with a non-linear stress-strain relationship, the two sides do not then equally deform. The compressed sheet will deform very little more and the tensed sheet will deform substantially by stretching.

For any given selection of materials and geometry there will be a given maximum sustainable local deformation in sheets 10 and 20 before layers 11 and 21 are forced together at the bending point, thus defeating the insulation at that point. This maximum sustainable local deformation determines a minimum bending radius. For the typical dimensions and preferred materials of this embodiment, a typical minimum bending radius is four times the panel thickness.

The degree of bending of the panel in one planar axis is limited only by the minimum bending radius at any point. There is no limit to the total bend that may be obtained. For example, the panel may be bent ninety degrees, in a full circle, or even rolled into multiple layers. The degree of bending of the panel in two planar axes, to conform to a compound curve, is limited again by the maximum local deformation of sheets 10 and 20. This may be expressed as the minimum bending radius as taken at any point in either planar direction. Typically, the minimum multiplanar bending radius will be the same as the single plane minimum bending radius.

An external bending force is required to effect and maintain all bends in this embodiment since, if released, the compressive forces in sheets 10 and 20 would return the panel to a generally flat shape. For the typical dimensions and preferred materials of this embodiment, the external bending forces would generally be 40 to 200 Newtons per meter (2.8 to 14 pounds per foot) of linear bend length. Such bending forces can be applied manually and bends can be maintained by securing the edge of the panel to one or more supports.

Description—FIGS. 3, 3A, 4, and 4A—Membrane with Stiffeners

Figure 3:
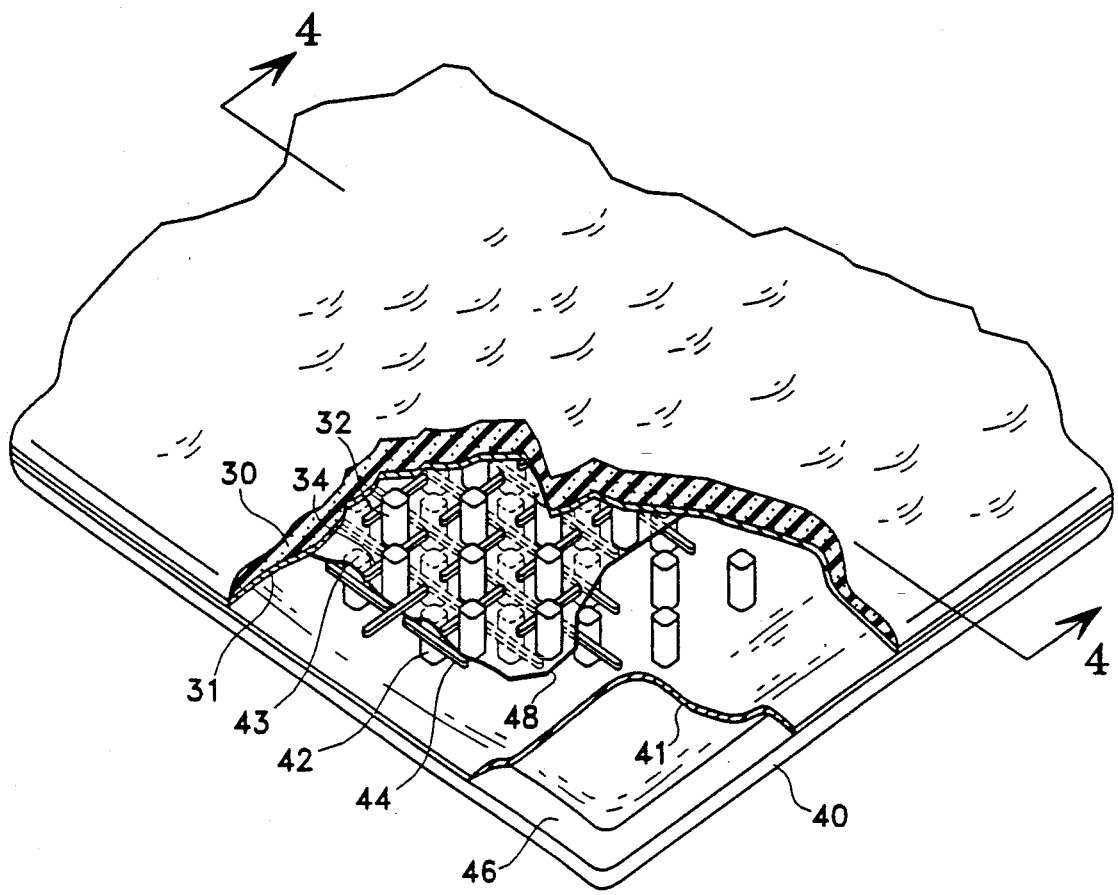
FIG. 3 shows a perspective view of a flexible evacuated insulating panel in accordance with my invention using a tension membrane with integral stiffeners, with the forward corner cut away to show the internal structure.
Figure 3A:
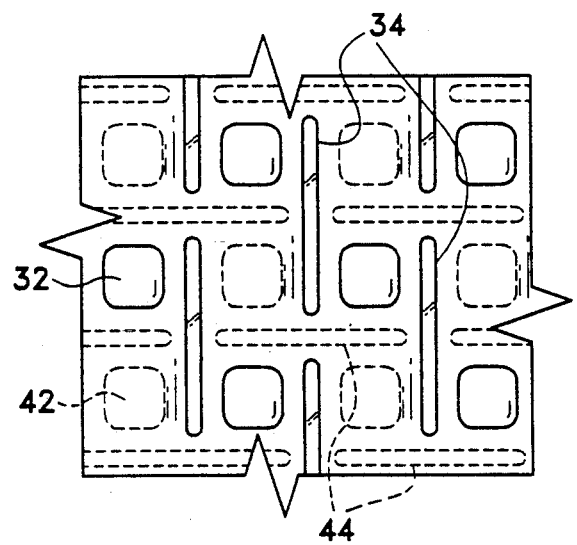
FIG. 3A shows a vertical view of an enlargement of the tension membrane, tension membrane stiffeners, and ends of the compression supports of FIG. 3.

A typical embodiment of a flexible evacuated insulating panel using a tension membrane with integral stiffeners is illustrated in FIG. 3—a perspective view. FIG. 3A shows a vertical enlargement of the tension membrane, FIG. 4 a cross-sectional view as seen in the direction indicated by line 4—4, and FIG. 4A an enlargement of the impermeable layer. The panel comprises a first resilient sheet 30 that is laminated to a first flexible impermeable layer 31. Below layer 31 is attached an array of compression supports 32 that extend downward from the sheet 31. Ends 33 of supports 32 engage a tension membrane 48. Below membrane 48 is another array of compression supports 42 with ends 43 that engage membrane 48. Supports 42 attach to a second flexible impermeable layer 41, below which is laminated a second resilient sheet 40. Supports 32 and 42 act as spacers. Sheets 31 and 41 may be comprised of several separate sheets 45, here shown as three.

This embodiment is characterized by the use of an array of lateral compression stiffeners 34 and 44 attached to membrane 48. FIG. 3A shows a vertical view of an enlargement of membrane 48, stiffeners 34 and 44, and support ends 32 and 42. Stiffeners 34 and 44 are attached in an orthogonal pattern on membrane 48, so that the stiffeners do not touch one another. This pattern forms a "tensegrity" structure of discontinuous compression elements joined by continuous tension elements, as defined by Fuller in U.S. Pat. No. 3,063,521 (1962). Ends 32 and 42 are joined only to membrane 48, and do not touch each other or stiffeners 34 and 44.

Figure 4:
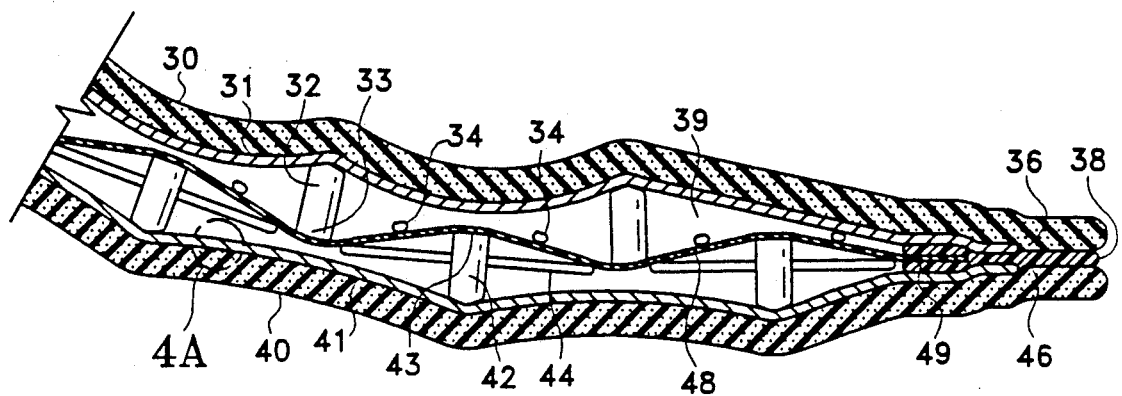
FIG. 4 shows a cross-sectional view of the flexible evacuated insulating panel of FIG. 3 as seen in the direction indicated by line 4—4.
Figure 4A:
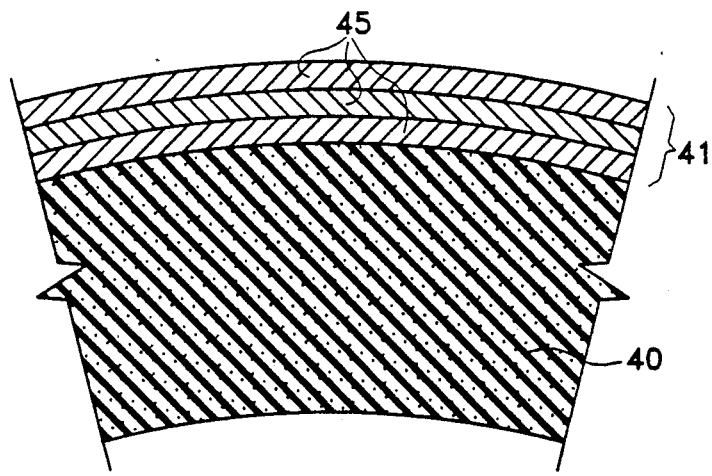
FIG. 4A shows an enlargement of the impermeable layer of FIG. 4.

As shown in FIGS. 3 and 4, sheets 30 and 40 have edges 36 and 46 at the sheet perimeters. Layers 31 and 41 join with edges 36 and 46 using a sealing material 38 to form a gas tight bond that also forms a tension membrane termination 49. An internal space 39 is so formed and is then evacuated of air.

The panel can have any suitable dimensions. As with the embodiment of FIGS. 1, 1A, 1B, 2, and 2A, thickness of membrane 48 preferably is thin, typically 0.01 to 0.1 mm. Supports 32 and 42 can be relatively fewer and larger, typically 5 to 10 mm high. The thickness of layers 31 and 41 typically is 0.05 to 0.5 mm. Generally, the thickness of sheets 30 and 40 is minimized, typically being 1 to 5 mm, just thick enough to protect the impermeable layers.

Material selection in this embodiment is the same as that for the embodiment of FIGS. 1, 1A, 1B, 2, and 2A. The additional elements of this embodiment, supports 32 and 42, and stiffeners 34 and 44, can be constructed of a low conductivity material, typically a polymer such as polyethylene or PTFE.

Operation—FIGS. 3, 3A, 4, and 4A

The flexible evacuated insulating panel in FIGS. 3, 3A, 4, and 4A becomes a thermal insulator as the air is evacuated from space 39 to a high vacuum. Upon evacuation, the ambient air pressure presses sheets 30 and 40 toward each other. Facewise compression is resisted by an internal structure made up of supports 32 and 42 pressing against membrane 48. In this embodiment in-plane compressive forces are carried by stiffeners 34 and 44 that are attached to membrane 48.

This panel is flexible and can be flexed while maintaining a vacuum. This flexing is possible because sheets 30 and 40, and layers 31 and 41, are able to change their amount of sagging between supports 32 and 42. The sheet and impermeable layer on the concave side of the panel sags more. The sheet and impermeable layer on the convex side of the panel sags less. Membrane 48 does not change its length upon bending of the panel, but stiffeners 34 and 44 hinge on membrane 48, allowing it to flex. These hinge points occur at stiffener ends 34 and 44, which are spaced away from adjacent stiffeners by a small distance. Yet, stiffeners 34 and 44 are still able to support in-plane compressive forces because, under load, the slack in those membrane hinges is taken up. The amount that the evacuated insulating panel structure can bend, without having the layers 31 and 41 touch membrane 48 depends on the geometry and the degree of bending. A sharper bend may be obtained by reducing the dimensions of all components to make a thinner panel structure. Typically, the minimum bending radius is five times the panel thickness. This panel is very flexible to applied. external manual loads, typically requiring under 20 Newtons per linear meter of bend (1.4 pounds per linear foot), or less.

External sheets 30 and 40 are not strictly necessary to the panel operation for insulation. But these sheets are provided to protect layers 31 and 41 from damage. Therefore, sheets 30 and 40 are selected of materials and dimensions that allow flexibility, but will also resist penetration and abrasion.

It may be appreciated that many different shapes, sizes and placements of sheets 30 and 40, supports 32 and 42, stiffeners 34 and 44, and membrane 48 are possible that are consistent with this embodiment. For example, stiffeners may be provided in a different arrangement, or established in multiple layers, or placed into vertical as well as horizontal disposition.

Description—FIGS. 5, 5A, 6 and 6A—High-porosity Separator

Figure 5:
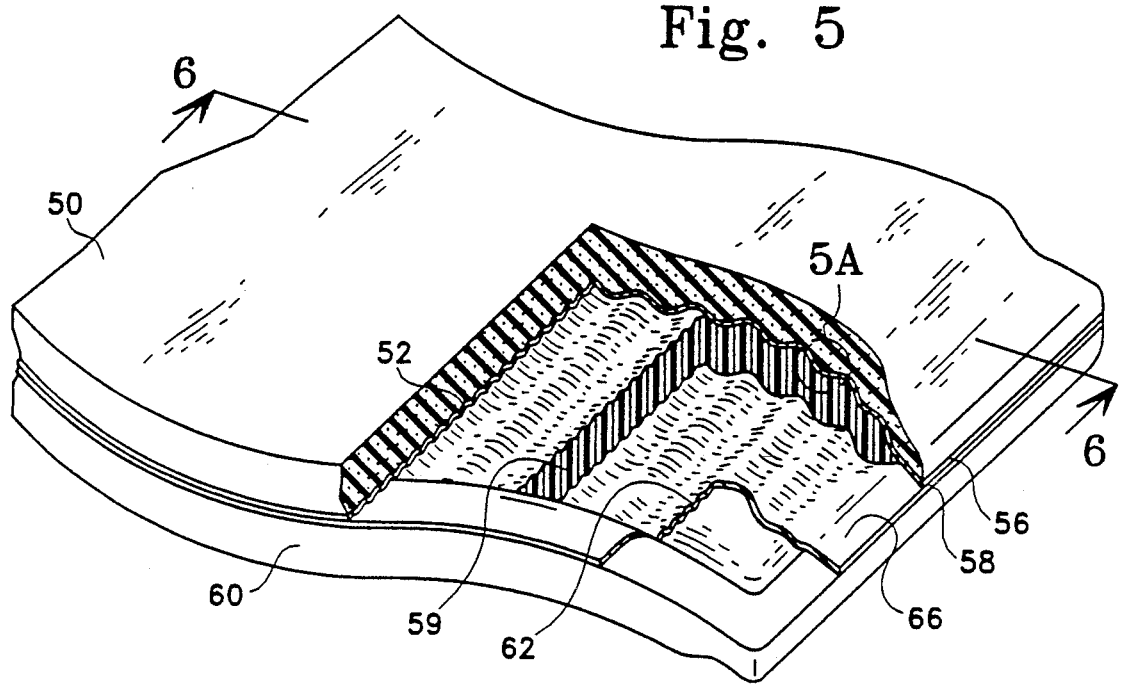
FIG. 5 shows a perspective view of a flexible evacuated insulating panel in accordance with my invention using a high-porosity spacer material, with the forward corner cut away to show the internal structure.
Figure 6:
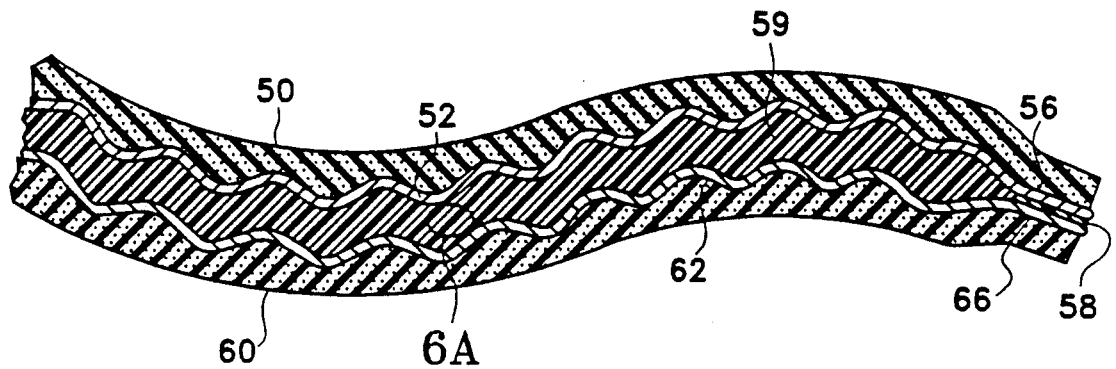
FIG. 6 shows a cross-sectional view of the flexible evacuated insulating panel of FIG. 5 as seen in the direction indicated by line 6—6.

A typical embodiment of a flexible evacuated insulating panel using a high-porosity spacer material is illustrated in FIG. 5—a perspective view and FIG. 6—a cross-sectional view. The panel comprises a first resilient sheet 50 and a first flexible impermeable layer 52 which is laminated to sheet 50. Below layer 52 is an evacuated high-porosity layer 59, which high-porosity layer acts as a spacer. Below layer 59 is a second flexible impermeable layer 62, which is laminated over a second resilient sheet 60. The perimeters of sheets 5o and 60 have abutting edges 56 and 66, respectively. Edges 56 and 66 are joined by a sealing material 5s to form a gas tight bond. The resulting internal cavity is filled by a high-porosity layer 59 and evacuated of air.

Figure 5A:
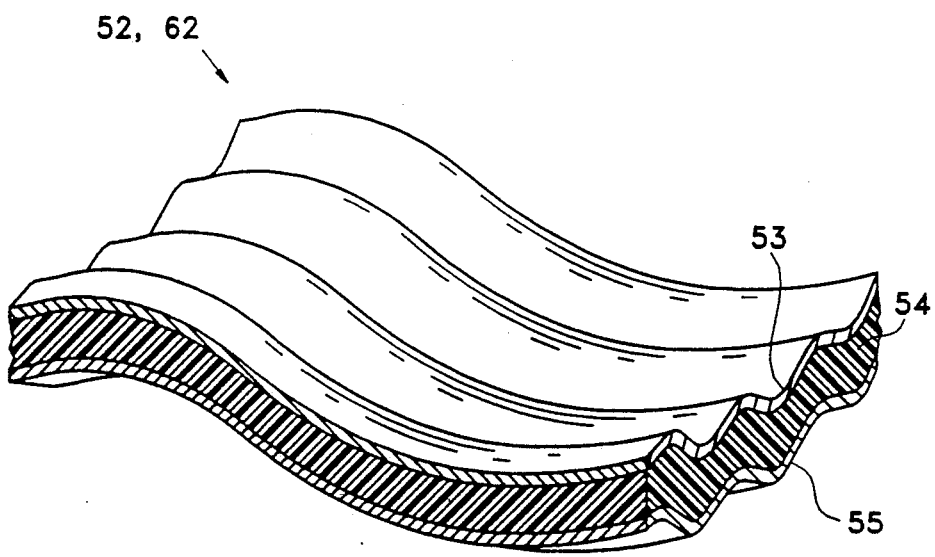
FIG. 5A shows a perspective view enlargement of a multi-layer corrugated impermeable layer of FIG. 5.

FIG. 5A—a perspective view enlargement of a multilayer corrugated impermeable layer of FIG. 5—further illustrates the construction of layer 52. Each of impermeable layers 52 and 62 comprises a first metallic sublayer 53 laminated to a resilient interlayer 54 that is then laminated to a second metallic sublayer 55. Each of metallic sublayers 53 and 55 is corrugated initially, with a fine pitch, in one planar direction. Layers 52 and 62 are then corrugated with a coarser pitch in the orthogonal planar direction to the fine corrugations in sublayers 53 and 55.

The panel can have any suitable dimensions. Generally, in this embodiment, the greater the thickness of high-porosity layer 59, the greater the insulation value. Yet, with large thicknesses the usefulness of a thin insulator is lost. Further, unless the high-porosity material is very flexible, making layer 59 thicker will decrease the flexibility of the entire panel. Layer 59 is typically 5 mm to 20 mm thick. Generally, the thicknesses of layers 52 and 62, and of metallic sublayers 53 and 55, are minimized, consistent with long-term maintenance of the vacuum. Layers 52 and 62 must be able to bend and stretch, as describe under operation below. Typical thicknesses for sublayers 53 and 55 are 0.05 to 0.2 mm and of interlayer 54, 0.05 to 2 mm.

It may be appreciated that additional metallic sublayers, with additional interlayers of resilient material, may be added to increase the overall impermeability without greatly reducing the ability of layers 52 and 62 to bend or stretch. The fine corrugations of sublayers 53 and 55 typically are 1 to 5 mm deep, and the coarse corrugations of layers 52 or 62 in the orthogonal direction are 2 to 10 mm deep. Generally, the thicknesses of sheets 50 and 60 is minimized, both to reduce the thickness of the insulation and to improve its flexibility, consistent with protecting layers 52 and 62 from external damage. Typical thicknesses for 50 and 60 are 2 to 10 mm, and may be made to fill in the corrugations of the layers 52 and 62 if desired.

Material selection for sheets 50 and 60, impermeable sublayers 53 and 55, and sealing material 58 is the same as that for the embodiment of FIGS. 1, 1A, 1B, 2, and 2A. Any suitable resilient material may be used for resilient sublayer 54, since that layer is not depended upon to block gas flow. The material for high-porosity layer 59 is selected for its ability to support compressive loads of ambient pressure, while allowing shear displacement at relatively low applied loads, and having the lowest possible coefficient of thermal conductivity. A typical material for layer 59 is silica aerogel having porosity of at least 95%. Heinemann, Huemmer, Buettner, Caps, and Fricke described the properties of silica aerogel in "A Light-Transmitting Thermal Superinsulator," in the journal "High Temperatures—High Pressures," vol. 18, number 5, pages 517-526, 1986. Recently, Lawrence Livermore National Laboratories developed a new production process for aerogel that may reduce the production cost significantly. Other high-porosity materials which are similar to silica aerogel may be possible using organic materials instead of silicon.

Figure 6A:
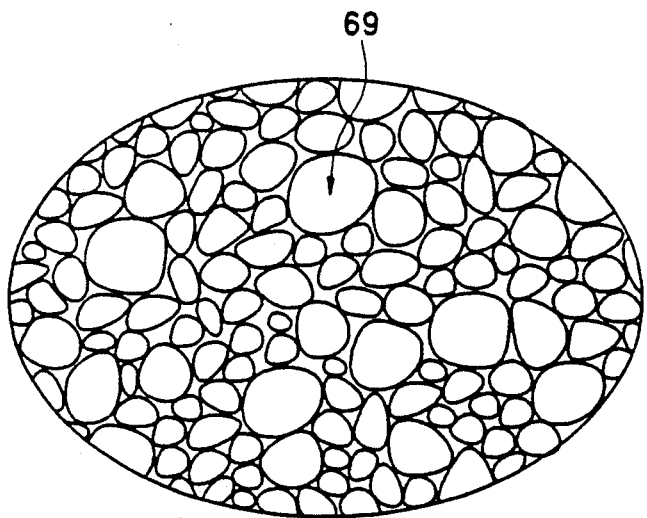
FIG. 6A shows a cross-sectional view enlargement of the particulate high-porosity layer of FIG. 6.

As shown in FIG. 6A—is a cross-sectional view enlargement of a particulate high-porosity layer of FIG. 6, layer 59 need not be a monolithic material. Layer 59 may consist of many separate particulates 69 randomly packed in point contact with each other, since there are no tensile forces on this layer. Generally, particulates 69 will be made of a relatively rigid, low-conductivity material. Therefore, additional materials for layer 59 include particulates of relatively rigid foamed plastics, of ceramic materials, or other non-metallic materials with low density. All materials are selected to maintain their properties of strength, resilience, flexibility and gas impermeability for the desired temperature range of operation.

Sheets 50 and 60, and layers 52, 53, 54, 55, 59, and 62 do not need to be attached to each other. The facewise pressure will hold the assemblage together under bending stresses. However, assembly techniques may be selected using, for example, plastic materials as described for sheets 50 and 60, that apply these materials to layers 52 and 62 at an elevated temperature or a non-plasticized state, effecting a solid bond.

Operation—FIGS. 5, 5A, 6 and 6A

The panel in FIGS. 5 and 6 becomes a thermal insulator as the air is evacuated from high-porosity layer 59 to a high vacuum. Upon evacuation, the ambient air pressure presses sheets 50 and 60 toward each other, giving facewise and edgewise forces. As described, these forces are resisted by compression in layer 59, which has a very low thermal conductivity.

The panel is able to bend while still maintaining its internal evacuated space when the materials and thickness selected for sheets 50 and 60, impermeable layers 52 and 62, and high-porosity layer 59 are generally flexible. This panel is shown with corrugations in a sandwich comprised of layers 52 and 62. It may be appreciated that such corrugations are very important to allow stretching of those layers when the entire panel is bent. Other arrangements of folding or corrugations to allow impermeable layer flexing, such as shown in FIG. 1B, may also be used in this embodiment. This panel is able to carry all edgewise compression forces in the same high-porosity layer 59 that carries the facewise compression forces. Therefore, sheets 50 and 60 are not required to carry compressive forces in their plane and may be made very resilient. Flexibility of the panel is then determined by the flexibility of layer 59. As described, layer 59 consists of either a resilient material or of particulates. In bending operation particulates 69 will rearrange by moving and sliding over each other. To bend, the panel will require applied, external manual loads typically under 100 Newtons per linear meter of bend (7.0 pounds per linear foot).

Description—FIGS. 7, 7A, 8, and 8A—Inflated Cellular Walls

Figure 7:
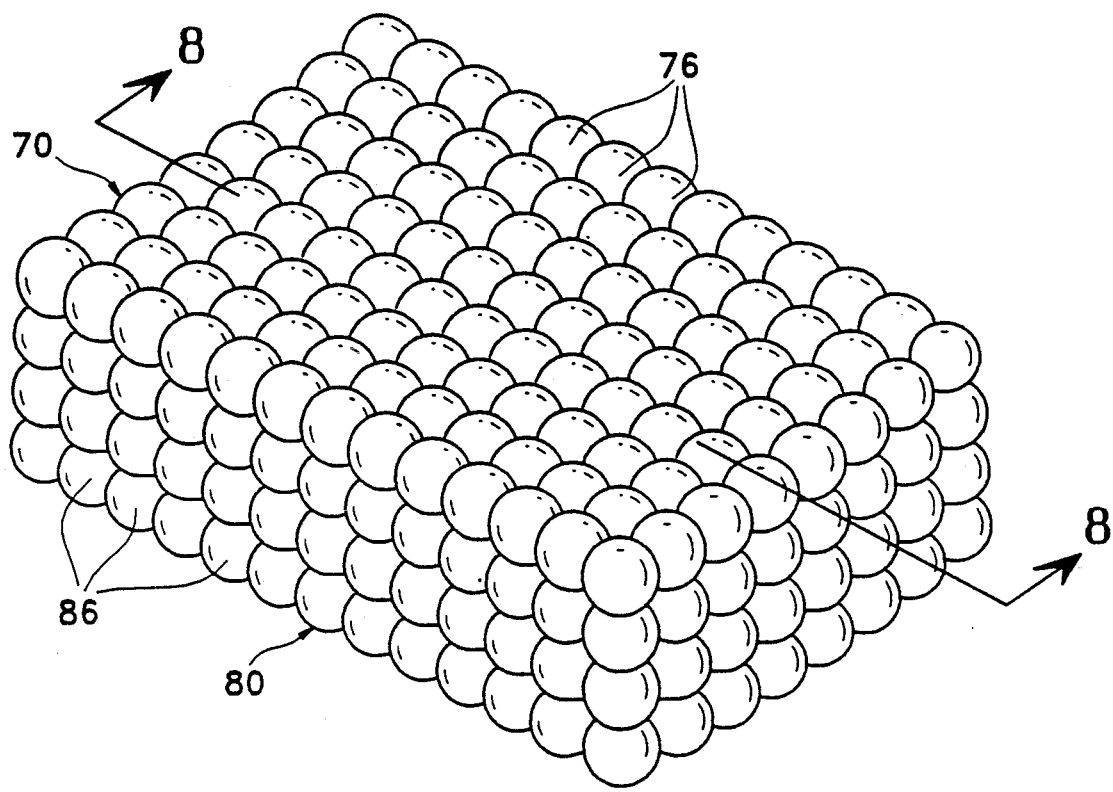
FIG. 7 shows a perspective view of a flexible evacuated insulating panel in accordance with my invention using inflated cellular walls.
Figure 8:
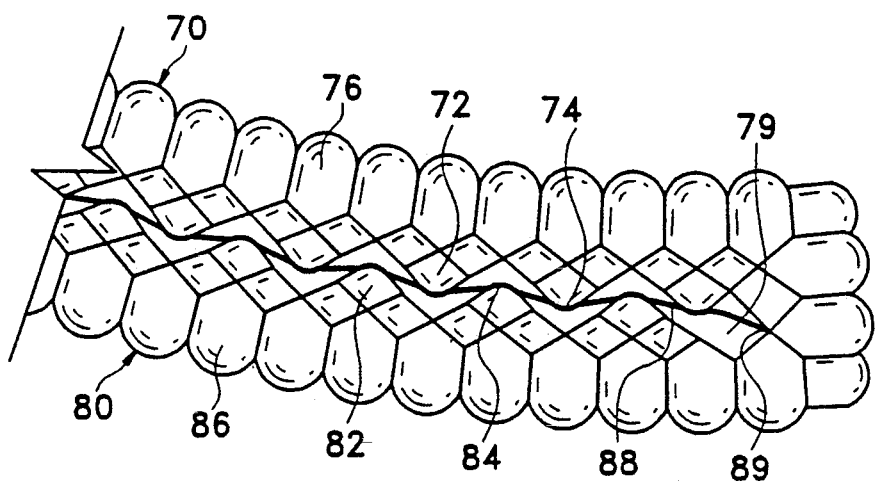
FIG. 8 shows a cross-sectional view of the flexible evacuated insulating panel of FIG. 7 as seen in the direction indicated by line 8—8.

A final embodiment of a flexible evacuated insulating panel using inflated cells as walls and supports is illustrated in FIG. 7—a perspective view—and FIG. 8—a cross-sectional view as seen in the direction indicated by line 8—8. This embodiment has a first flexible inflated impermeable sheet 70 consisting of an array of inflated cells 76. Such inflated cells are also arranged into projecting compression supports 75 that attach to sheet 70. There is a second flexible inflated impermeable sheet 80 consisting of an array of inflated cells 56. Such inflated cells are also arranged into a second set of projecting compression cellular supports 52. Supports 72 and 52 act as internal spacers. Cells 76 and 52 are formed from an impermeable material that are then inflated with a gas. A tension membrane 88 attaches compression supports ends 74 on sheet 70 to compression supports ends 84 on the sheet 80. Membrane 88 is terminated 89 at the perimeter cells defining sheets 70 and 80.

The perimeters of sheets 70 and 80 are formed together as one continuous structure of contiguous inflated cells. While each of cells 76 or 86 may, or may not, have gas communication with adjacent cells, no cell has gas communications with the interior or the exterior. Therefore, sheets 70 and to form a gas impermeable, internal cavity space 79, which is evacuated.

The panel can have any suitable dimensions. As described in the embodiment of FIGS. 1, 1A, 1B, z, and 2A, the width of vacuum space 79 may be very small. The principal thermal conductivity loss is membrane 88. The cross sectional area of that membrane may be reduced as described earlier. The thickness of sheets 70 and 80 must be sufficient to support the in-plane compressive forces as described under operation below. Typical external sheet thicknesses are 10 to 50 mm.

It will be appreciated that many different shapes, sizes, and placements of cells 76 and 86 making up sheets 70 and 80, and supports 72 and 82 are possible that are consistent with the claimed cellular structure. For example, in one such alternative arrangement the cells may be arranged to form a closed, evacuated space that encases an entire volume, rather than a thin layer of vacuum.

Figure 7A:
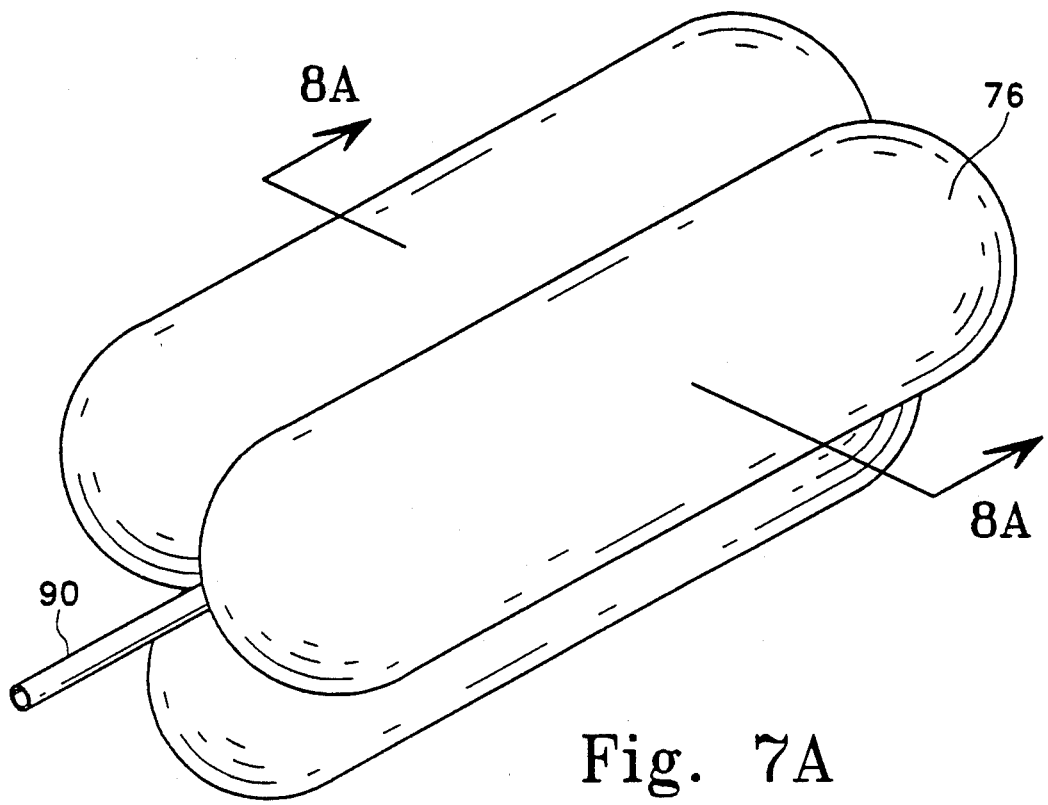
FIG. 7A shows a perspective view of a flexible evacuated insulating panel in accordance with my invention that insulates a tubular space with inflated cellular walls.
Figure 8A:
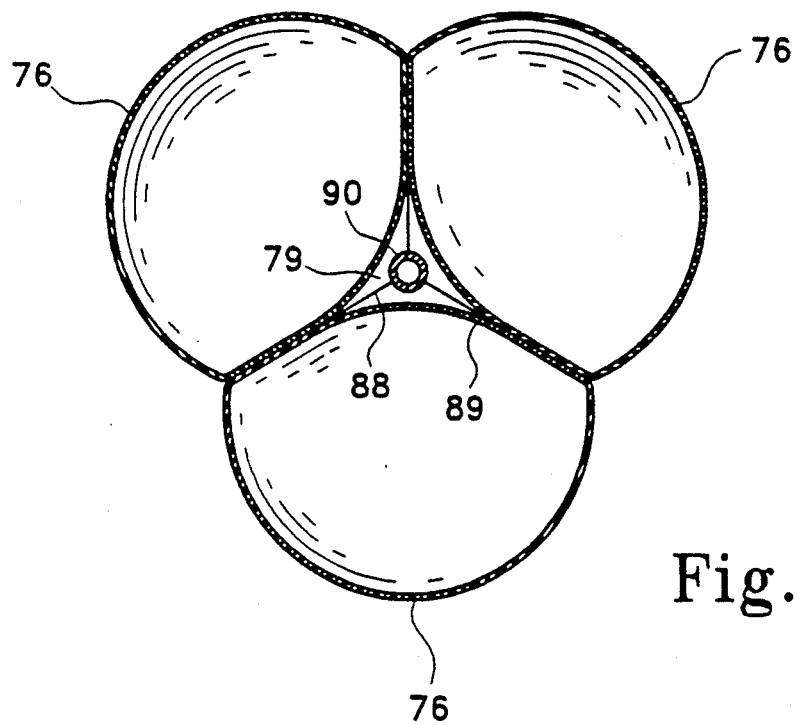
FIG. 8A shows a cross-sectional view of the flexible evacuated insulating panel of FIG. 7A as seen in the direction indicated by line 8A—8A.

FIG. 7A—a perspective view of a tubular insulated space with inflated cellular walls and FIG. 8A—a cross-sectional view of FIG. 7A as seen in the direction indicated by line 8A—8A, shows an arrangement of inflated cells to encase a volume and insulate an elongated shape. Cells 76 are wrapped about an axis, encircling it. Space 79 is evacuated of air. Three tension membranes 88 are terminated 89 at the junctions of cells 76, so that membranes 88 extend toward the axis to secure any desired object to be insulated. Here this object is illustrated as pipe 90, which is highly insulated, being held in evacuated space 79 only by tension membranes 88. As with the panel arrangement of cells, this arrangement of inflated cells to encase a volume may have any suitable dimensions. The gap between the inner walls of cells 76 and the insulated object, here shown as pipe 90, defines the minimum width of vacuum space 79, which may be very small.

Material selection is important for the flexible impermeable material making up cells 76 and 86. This material must allow bending, but no substantial stretching in length, under loads of approximate 1.5 to 3 times ambient pressure in the cell interiors. The material must be generally impermeable to the passage of gases, even when used in relatively thin layers. It is further advantageous that the material can be easily glued, or heat and pressure sealed, to form cells. Typically, this material is a laminate of a sheet polymer, as in polyethylene or polyester sheet, to which is bonded a thin metallic impermeable layer, such as aluminum. With the cellular panel, typical thickness for the polymer layer is 0.01 mm to 0.1 mm; typical thickness for the metallic layer is 0.01 mm to 0.02 mm. In the volume encasing cellular arrangement, cells can be larger, giving larger total forces on the cell walls, with typical polymer layer thickness of 0.1 to 3 mm. The polymer/metallic laminate can also be made in multiple layers to improve strength and impermeability while maintaining flexibility.

Operation—FIGS. 7, 7A, 8 and 8A

The embodiment in FIGS. 7 and s becomes a thermal insulator as the air is evacuated from space 79 to a high vacuum. One way to establish such a vacuum in this embodiment first collapses space 79, which occurs when cells 76 and 86 are partially or totally deflated. When cells 76 and 86 are then inflated sufficiently, evacuated space 79 will form. Upon evacuation the ambient air pressure presses sheets 70 and 80 toward each other. This compression is resisted by supports 72 and 82 pressing against membrane 88. Alternately, when cells 76 encase a volume, evacuating space 79 creates a pull on the cell walls adjacent to that interior space, which pull is resisted by the pressure in cells 76 on exterior cell walls.

This embodiment supports all compressive loads with inflated cells 76 and 86. As such, these cells must support the facewise and edgewise compressive forces of the ambient pressure against the evacuated space, as described in the embodiment of FIGS. 1, 1A, 1B, 2, and 2A. Cells 76 and 86 must be inflated and maintained at a sufficient pressure to resist collapse under these applied loads. In "Tension Structures: Behavior and Analysis" (ISBN 0-07-037226-8) John William Leonard describes such structures and the appropriate analysis for their design. While such analysis can be very complex, and depends on the exact geometries and loads of interest, generally the interior pressure of the cells is 1.5 to 3 times the ambient pressure.

Upon bending, sheets 70 and 80 are able to compress and expand to a degree. The sheet on the inside of the bend will be in compression, and will evidence expansion of the exterior cell walls on that side. The sheet on the outside of the bend will be in tension, and will evidence a flattening of the exterior cell walls on that side. Generally, the applied loads to effect bending will be relatively large, typically 200 Newtons per linear meter of bend (14 pounds per linear foot), or more.

SUMMARY, RAMIFICATIONS, AND SCOPE

Accordingly, the reader will see that my flexible evacuated insulating panel has all of the insulating properties of rigid evacuated insulators: very low thermal conductivity, low thickness, and low weight. The panel has the following further advantages:

- it provides an evacuated insulating panel that can be bent into sharp or compound curves.
- it has separated the structural elements, providing resistance to collapse and impermeability, and allowing different materials to be used for each, thereby to improve flexibility while better withstanding fatigue failure.
- it provides evacuated insulators that can flex in use.
- it provides an evacuated panel that can be manually flexed to fit curved surfaces during a fabrication process.
- it provides mass-producible evacuated insulating panels which are useful in many different applications without customizing.
- it provides evacuated insulating panels using inexpensive materials and manufacturing processes. This will greatly increase the economical applications for evacuated insulators.

Although the above description contains many specificities, these should not be construed as limiting the scope of the invention, but as merely providing illustrations of some of the presently preferred embodiments of this invention. Many other variations are possible. For example, many different arrangements of compression supports may be used, such as hexagonal; different materials and combinations of materials may be used, such as using multiple layers of metallic foils and elastic plastic in either the external sheets or the impermeable layers, or use of any newly-developed highly-impermeable materials; different shapes and foldings may be used for the corrugations in impermeable layers; the external sheets may be reinforced at certain points for attachment to other structures; multiple flexible evacuated insulating panels may be stacked to form one structure for additional thermal conductive resistance; multiple internal evacuated spaces may be constructed to reduce the effects of failure in an impermeable layer; highly reflective surfaces may be provided on the inner surfaces of the sheets or on tension membranes to reduce radiation transmission of heat; provision may be made to attach, temporarily or permanently, a vacuum pump to maintain a good vacuum; etc.

Thus the scope of the invention should be determined by the appended claims and their legal equivalents, rather than by the examples given.

I claim:

1. A lightweight thermal insulating panel comprising:
   two flexible, gas-impermeable sheets, each of said sheets including at least one layer of generally gas-impermeable metallic material, said metallic layer of generally gas-impermeable material being corrugated in at least one direction,
   sealing means for joining the perimeters of said sheets to form an interior space between said sheets, said interior space being at less than atmosphere pressure,
   spacer means separating said sheets and maintaining said interior space against ambient pressure acting normal to the plane of said sheets, tending to apply a facewise collapsing force against said sheets,
   a layer of generally resilient material laminated to the exterior of each of said sheets, respectively, said layer of generally resilient material at lest partially filling said corrugations in said layers of gas-impermeable material, said generally resilient material supporting compressive loads for maintaining said interior space against ambient pressure acting in the plane of said sheets, tending to apply an edgewise collapsing force to said sheets,
   the combination of said sheets, said sealing means, said spacer means and said layers of generally resilient material forming a single evacuated thermal insulating panel which can be flexed in more than one plane to conform to curved surfaces in a radius smaller than approximately ten times the thickness of said panel.

2. The insulating panel of claim 1 wherein said spacer means comprises a plurality of compressively-loaded spacers for holding said sheets apart, said spacers each having one end attached to a sheet and extending to a tension membrane positioned between said sheets such that each spacer has another end positioned between and spaced from both of said sheets, said tension membrane being attached to said edges of said sheets.

3. The insulating panel of claim 2 wherein said layers of gas-impermeable material are corrugated in two orthogonal directions by multiple folds, said folds making a repeating pattern in adjacent connecting areas of said layers of gas impermeable material, said repeating pattern forming projecting compression supports, said supports constituting said spacers, each of said patterns of said supports having two parts, each of said parts consisting of an upper isosceles triangle, two parallelograms, and two lower isosceles triangles, each of said upper and lower triangles and said parallelograms having two 45 degree angles, said upper triangle being joined on each of its shorter sides to said parallelograms with one of said folds in a downward direction, said parallelograms each being joined on its side opposite to said upper triangle to the longest side of said lower triangles with one of said folds in an upward direction, said parts being joined on the longer sides of said upper triangles with one of said folds in an upward direction, said parts also being joined along the sides of said parallelograms with two of said folds in a downward direction.

4. The insulating panel of claim 3 wherein said layer of generally resilient material fills all of said corrugations in said layers of impermeable material, whereby each of said impermeable sheets is flat on its exposed side.

5. The insulating panel of claim 2 wherein said layer of gas-impermeable material comprises a gas-impermeable material which is corrugated in two orthogonal directions, said corrugations being relatively fine in a first direction and relatively coarse in an orthogonal direction.

6. The insulating panel of claim 5 wherein said layer of gas-impermeable material comprises a plurality of metallic sheet layers laminated to resilient interlayers between each of said metallic layers.

7. The insulating panel of claim 1 wherein said layer of generally resilient material has a non-linear stress-strain relationship such that it will undergo a greater change in length when tensed with a given force than when compressed with said given force.

8. The insulating panel of claim 2, further including a plurality of stiffening members attached solely to said tension membrane, whereby said stiffening members in combination with said tension membrane support compressive loads in the plane of said panel without allowing contact between said stiffening members.

9. The insulating panel of claim 8 wherein said gas-impermeable sheets comprise a plurality of impermeable metallic layers, said metallic layers being separated by resilient interlayers laminated between each of said impermeable metallic layers.

10. The insulating panel of claim 8 wherein said gas-impermeable sheets further include a flexible external protective layer laminated to said layer of generally resilient material.

11. A lightweight thermal insulating panel, comprising:
 a. a pair of opposed, flexible gas-impermeable sheets;
 b. sealing means for forming at least one internal cavity between said sheets, said internal cavity being at less than ambient pressure; and
 c. resilient, high-porosity spacer means disposed in said internal cavity for compressionally transmitting forces between said sheets, said forces generally being directed both in the plane of said sheets and orthogonal to the plane of said sheets;
 d. each of said sheets including at least one metallic layer of gas-impermeable material which is corrugated in at least one direction;
the combination of said flexible impermeable sheets, said sealing means, said spacer means, and said corrugated impermeable material forming a single evacuated thermal insulating panel that can be flexed in at least one plane to conform to curved surfaces while maintaining said internal cavity at less than ambient pressure.

12. The insulating panel of claim 11 wherein said high-porosity material comprises a silica aerogel with greater than 95 percent porosity.

13. The insulating panel of claim 11 wherein said high-porosity material comprises a plurality of low thermal conductivity particulates.

14. The insulating panel of claim 11 wherein said layer of impermeable material comprises a generally non-resilient, gas-impermeable material which is corrugated in two orthogonal directions, so that said corrugations are relatively fine in a first direction and relatively coarse in an orthogonal direction.

15. A lightweight cellular thermal insulating structure comprising:
 a plurality of cells each formed of a flexible and gas-impermeable material including a metallic component, the interiors of said cells being sealed from ambient fluid, and cell interiors being inflated to higher than ambient pressure,
 said cells being joined at the perimeters thereof to form at least one internal cavity sealed from said ambient fluid, said internal cavity being at less than ambient pressure,
 whereby said plurality of cells surround said internal cavity to form an inflated structure which resists the force of ambient pressure tending to collapse said internal cavity.

16. The cellular structure of claim 15 wherein said cells are arranged to form a pair of opposing flexible external sheets and a plurality of internal spacers, said external sheets being held apart by said internal spacers.

17. The cellular structure of claim 16 further including a tension membrane between said internal spacers, said spacers being compressively-loaded, said spacers reaching from each said external sheet to said tension membrane.

18. The cellular structure of claim 17 wherein said tension membrane is a flat web having a surface area approximately the size of said sheets, said tension membrane being attached to the peripheries of said external sheets.

19. The cellular structure of claim 15 wherein said inflated cells are charged with gas at a pressure at least 1.5 times ambient pressure.

20. The cellular structure of claim 15 wherein said flexible and impermeable material comprises a laminate of a polymer sheet bonded to a metallic impermeable layer.

21. The cellular structure of claim 15 wherein the material of said cells is sufficiently flexible to be flexed to conform to curved surfaces.

22. A lightweight thermal insulating generally planar panel comprising first and second flexible, gas impermeable sheets, the sheets being sealed together to form an evacuated space between opposing faces of the sheets; a metallic layer member extending generally in a plane of the panel, the metallic layer member including undulating segments located in the evacuated space, a peripheral portion of the metallic layer member being fixedly attached to the sheets; undulations of the undulating segments extending generally at right angles to the plane of the panel, between the opposing faces so peaks of the undulations are proximate one of the faces and troughs of undulations are proximate another of the faces; the undulating segments being supported by projections on the first and second sheets, the projections including a component extending generally at right angles to the plane of the panel for maintaining said evacuated space against ambient pressure acting normal to the plane of the panels; the sheets including further undulations on surfaces thereof opposite from the opposing faces, the further undulations being at least partially filled with generally resilient material for supporting compressive loads and maintaining said evacuated space against ambient pressure acting in the plane of said sheets, tending to apply an edgewise collapsing force to said sheets, the combination of said sheets, said undulating segments and said layers forming a single evacuated thermal insulating panel which can be flexed in more than one plane to conform to curved surfaces in a radius smaller than approximately ten times the thickness of said panel.

23. The panel of claim 22 wherein the metallic layer member comprises a membrane with corrugations forming the undulations, the corrugations including troughs and peaks abutting corresponding peaks and troughs of the first and second sheets respectively forming the projections thereon.

24. The panel of claim 22 wherein the metallic layer member comprises a membrane with corrugations forming the undulations, the corrugations including troughs and peaks abutting struts extending generally at right angles to the plane from corresponding peaks and troughs of the first and second sheets, the struts forming the projections on the first and second sheets.

25. The panel of claim 24 wherein the membrane includes lateral compression stiffeners between the struts.

26. The panel of claim 25 wherein the membrane includes cross lateral compression stiffeners between adjacent troughs of the membrane, the lateral compression stiffeners and the cross lateral compression stiffeners being at right angles to each other.

27. The panel of claim 26 wherein the lateral compression stiffeners and the cross lateral compression stiffeners are on opposite faces of the membrane.

28. The panel of claim 24 wherein the membrane includes cross lateral compression stiffeners between adjacent troughs of the membrane.

29. The panel of claim 22 wherein the evacuated space includes a high porosity layer with corrugations forming the undulations, the corrugations of the high porosity layer being in contact with corresponding first corrugations of the first and second sheets forming the projections, the further undulations being formed by second corrugations on the sheets corresponding with the first corrugations on the sheets.

30. The panel of claim 29 wherein only a portion of the high porosity layer includes said first corrugations, the remainder of the high porosity layer in the evacuated space being separated from the first and second sheets by the evacuated space.

31. The panel of claim 29 wherein opposite faces of the high porosity layer include said first corrugations throughout the length thereof, said first corrugations throughout the length of said high porosity layer abutting said corresponding corrugations of the first and second sheets.

32. The panel of claim 22 wherein at least one of the sheets includes multiple inflated cells.

33. The panel of claim 22 wherein the sheets include membranes, said undulations and further undulations of the membranes and first and second sheets extend in two directions generally at right angles to each other.

* * * * *